(12) United States Patent
Qu et al.

(10) Patent No.: US 10,996,118 B2
(45) Date of Patent: May 4, 2021

(54) SENSOR APPARATUS

(71) Applicant: HUAWEI TECHNOLOGIES CO., LTD., Guangdong (CN)

(72) Inventors: Lin Qu, Xi'an (CN); Haohui Long, Beijing (CN); Xiong Yang, Shenzhen (CN); Taixiang Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 511 days.

(21) Appl. No.: 16/065,380

(22) PCT Filed: Dec. 21, 2016

(86) PCT No.: PCT/CN2016/111267
§ 371 (c)(1),
(2) Date: Jun. 22, 2018

(87) PCT Pub. No.: WO2017/107915
PCT Pub. Date: Jun. 29, 2017

(65) Prior Publication Data
US 2020/0348190 A1 Nov. 5, 2020

(30) Foreign Application Priority Data
Dec. 24, 2015 (CN) .......................... 201521098417.2

(51) Int. Cl.
*G01L 1/14* (2006.01)
(52) U.S. Cl.
CPC .................................... *G01L 1/142* (2013.01)
(58) Field of Classification Search
CPC ............................... H02K 5/225; G01L 1/142
(Continued)

(56) References Cited

U.S. PATENT DOCUMENTS 3,463,327 A * 8/1969 Lester .................... G08C 19/12
212/285
4,719,538 A 1/1988 Cox
(Continued)

FOREIGN PATENT DOCUMENTS

CN 201754116 U 3/2011
CN 102105852 A 6/2011
(Continued)

OTHER PUBLICATIONS

International Search Report and Written Opinion issued in International Application No. PCT/CN2016/111267 dated Mar. 1, 2017, 15 pages.
(Continued)

*Primary Examiner* — Octavia Hollington
(74) *Attorney, Agent, or Firm* — Fish & Richardson P.C.

(57) ABSTRACT

In one example implementation, a sensor apparatus includes a bracket, a first polar plate, a first contact portion, a first leading wire, a rotating shaft, a support frame, a second polar plate, a second contact portion, and a second leading wire. The bracket is of a cylindrical structure with two open ends. The first leading wire is disposed on the first polar plate and an external side of the bracket, one end of the first leading wire is connected to the first contact portion, and the other end of the first leading wire is connected to the first polar plate. The second contact portion is disposed at a first end of the support frame. The second leading wire is disposed on the support frame and the second polar plate.

13 Claims, 2 Drawing Sheets

(58) Field of Classification Search
USPC .................................................. 73/862.626
See application file for complete search history.

(56) References Cited

U.S. PATENT DOCUMENTS

| | | | |
|---|---|---|---|
| 5,959,212 A | 9/1999 | Sogge et al. | |
| 7,784,366 B2* | 8/2010 | Daverman | G01L 1/146 |
| | | | 73/862.626 |
| 10,107,701 B2* | 10/2018 | McNeil | G01L 9/0072 |
| 2008/0257060 A1 | 10/2008 | Morimoto | |
| 2010/0024573 A1 | 2/2010 | Daverman et al. | |
| 2010/0101329 A1 | 4/2010 | Berris, Jr. | |
| 2011/0278078 A1 | 11/2011 | Schediwy et al. | |
| 2012/0180575 A1 | 7/2012 | Sakano et al. | |
| 2016/0169760 A1 | 6/2016 | McNeil et al. | |

FOREIGN PATENT DOCUMENTS

| | | |
|---|---|---|
| CN | 102589792 A | 7/2012 |
| CN | 103674412 A | 3/2014 |
| CN | 102980691 B | 9/2014 |
| CN | 103411712 B | 12/2015 |
| CN | 205449348 U | 8/2016 |
| JP | 2000004027 A | 1/2000 |
| JP | 2004294254 A | 10/2004 |
| JP | 2008267923 A | 11/2008 |

OTHER PUBLICATIONS

Extended European Search Report issued in European Application No. 16877725.8 dated Nov. 26, 2018, 8 pages.
Office Action issued in Japanese Application No. 2018-532549 dated May 21, 2019, 1 page.

\* cited by examiner

SENSOR APPARATUS

CROSS-REFERENCE TO RELATED APPLICATIONS

This application is a National Stage of International Application No. PCT/CN2016/111267, filed on Dec. 21, 2016, which claims priority to Chinese Patent Application No. 201521098417.2, filed on Dec. 24, 2015. Both of the aforementioned applications are hereby incorporated by reference in their entireties.

This application claims priority to Chinese Patent Application No. 201521098417.2, field with the Chinese Patent Office on Dec. 24, 2015 and entitled "SENSOR APPARATUS", which is incorporated herein by reference in its entirety.

TECHNICAL FIELD

The present invention relates to the field of technologies of integrated circuit manufacturing, packaging, and measurement, and in particular, to a sensor apparatus.

BACKGROUND

A sensor is a main component of an electronic device. The sensor can sense measured information, and can convert, according to a rule, the measured information sensed by the sensor into an electrical signal or information in another required form for output, so as to meet requirements, such as information transmission, processing, storage, display, recording, and control. A stress sensor mainly converts stress-induced deformation of a to-be-measured object into a resistance change or a capacitance change to implement stress measurement.

In the prior art, a strain gauge sensor is usually used to measure stress applied to an object. In specific usage, a strain gauge sensor is attached to a surface of a measured object by using an adhesive. The strain gauge sensor can measure, by using the adhesive, whether the surface of the measured object is deformed because of stress, and transmit a signal measured by the strain gauge sensor to a stress tester by using a conducting wire connected to the strain gauge sensor. The stress tester converts the measured signal into an electrical signal and sends the electrical signal to a computer for analysis, so that a value of the stress applied to the measured object is finally obtained.

However, when the prior art is used, stress-induced deformation of the measured object is transmitted to the strain gauge sensor by using the adhesive. Because a rigidity change of the adhesive may affect correctness of a result, collected by the strain gauge sensor, of the stress applied to the measured object, measurement accuracy of the strain gauge sensor is decreased.

SUMMARY

Embodiments of the present invention provide a sensor apparatus, so as to resolve a prior-art problem of low measurement accuracy of a strain gauge sensor.

According to a first aspect, the embodiments of the present invention provide a sensor apparatus, including a bracket, a first polar plate, a first contact portion, a first leading wire, a rotating shaft, a support frame, a second polar plate, a second contact portion, and a second leading wire, where the bracket is of a cylindrical structure with two open ends;

the first polar plate is disposed at a first end of the bracket;

the first contact portion is configured to be in rigid contact with a to-be-measured object, and is disposed at a second end of the bracket;

the first leading wire is disposed on the first polar plate and an external side of the bracket, one end of the first leading wire is connected to the first contact portion, and the other end of the first leading wire is connected to the first polar plate;

the second contact portion is disposed at a first end of the support frame, the second polar plate is disposed at a second end of the support frame, the rotating shaft is disposed between the first end of the support frame and the second end of the support frame, and the support frame is hinged to the bracket by using the rotating shaft;

the second contact portion is configured to be in rigid contact with the to-be-measured object; and the second leading wire is disposed on the support frame and the second polar plate, one end of the second leading wire is connected to the second contact portion, the other end of the second leading wire is connected to an internal side of the bracket, and both the other end of the second leading wire and the first leading wire are located on a same side of the bracket.

With reference to the first aspect, in a first possible implementation of the first aspect, the sensor apparatus further includes an elasticity balancing component, connected to both the rotating shaft and one end of the support frame.

With reference to the first aspect or the first possible implementation of the first aspect, in a second possible implementation of the first aspect, the sensor apparatus further includes an outer package body, where the bracket is placed in a cavity of the outer package body; and the first contact portion and the second contact portion are placed at the bottom of the outer package body.

With reference to the second possible implementation of the first aspect, in a third possible implementation of the first aspect, the sensor apparatus further includes a sensing portion embedded on the top of the outer package body, where the sensing portion is in contact with the first polar plate.

With reference to the second possible implementation of the first aspect, in a fourth possible implementation of the first aspect, the sensing portion includes a sensing rod, and a first elastic component and a second elastic component that are configured to restrict movement of the sensing rod, where the sensing rod is in contact with the first polar plate.

With reference to the second possible implementation of the first aspect, in a fifth possible implementation of the first aspect, the sensing portion is an elastic film.

With reference to the first possible implementation of the first aspect, in a sixth possible implementation of the first aspect, the elasticity balancing component includes a third elastic component connected to the rotating shaft and a fourth elastic component connected to one end of the support frame.

With reference to the first aspect, in a seventh possible implementation of the first aspect, the bracket is a cylinder, and the cylinder is of a hollow structure.

With reference to the first aspect, in an eighth possible implementation of the first aspect, a protrusion is provided on the internal side of the bracket, and the other end of the second leading wire is connected to the protrusion.

The sensor apparatus provided in the present invention includes the bracket, the first polar plate, the first contact portion, the first leading wire, the rotating shaft, the support frame, the second polar plate, the second contact portion, and the second leading wire. The bracket is of a cylindrical structure with two open ends. The first polar plate is disposed at the first end of the bracket. The first contact portion is configured to be in rigid contact with the to-be-measured object, and is disposed at the second end of the bracket. The first leading wire is disposed on the first polar plate and the external side of the bracket, one end of the first leading wire is connected to the first contact portion, and the other end of the first leading wire is connected to the first polar plate. The second contact portion is disposed at the first end of the support frame, the second polar plate is disposed at the second end of the support frame, the rotating shaft is disposed between the first end of the support frame and the second end of the support frame, and the support frame is hinged to the bracket by using the rotating shaft. The second contact portion is configured to be in rigid contact with the to-be-measured object. The second leading wire is disposed on the support frame and the second polar plate, one end of the second leading wire is connected to the second contact portion, the other end of the second leading wire is connected to the internal side of the bracket, and both the other end of the second leading wire and the first leading wire are located on the same side of the bracket. In this way, the first polar plate and the first leading wire form a first electrode of a capacitor, the second polar plate and the second leading wire form a second electrode of the capacitor, and the sensor apparatus is in rigid contact with the to-be-measured object by using the first contact portion and the second contact portion. Therefore, a stress change of the to-be-measured object is converted into a capacitance value change of the capacitor formed by the first electrode and the second electrode. In this case, the stress change of the to-be-measured object can be accurately obtained by means of analysis according to the capacitance value change of the capacitor, thereby avoiding a prior-art problem of an inaccurate measurement result caused when the strain gauge sensor apparatus used needs to be attached to a surface of a measured object by using an adhesive.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

REFERENCE NUMBERS

1: Bracket;
2: First leading wire;
3: First contact portion;
4: Rotating shaft;
5: Support frame;
6: Second contact portion;
7: Second leading wire;
8: Elasticity balancing component;
9: Outer package body;
10: Third spring component;
11: Fourth spring component;
12: Sensing rod;
13: Protrusion;
14: Elastic film;
20: First elastic component;
21: Second elastic component;
30: First end of the bracket;
31: Second end of the bracket;
40: First end of the support frame;
41: Second end of the support frame.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art on a basis of the embodiments of the present invention without creative efforts shall fall within the protection scope of the present invention.

Figure 1:
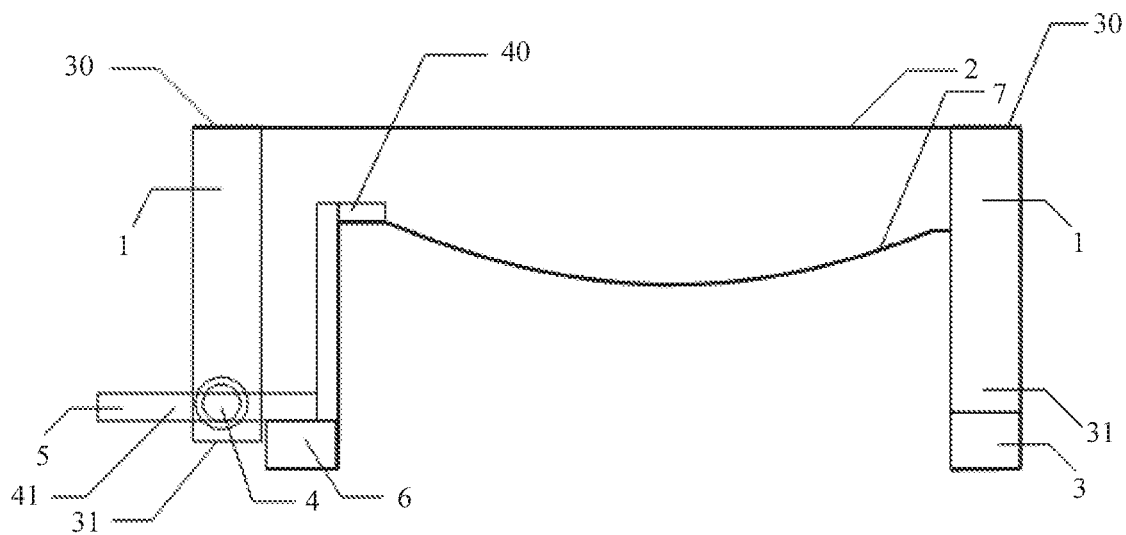
FIG. 1 is a schematic structural diagram of Embodiment 1 of a sensor apparatus according to the present invention.

FIG. 1 is a schematic structural diagram of Embodiment 1 of a sensor apparatus according to the present invention. As shown in FIG. 1, the sensor apparatus in this embodiment includes a bracket 1, a first polar plate (not shown in the figure), a first contact portion 3, a first leading wire 2, a rotating shaft 4, a support frame 5, a second polar plate (not shown in the figure), a second contact portion 6, and a second leading wire 7.

The bracket 1 is of a cylindrical structure with two open ends.

The first polar plate is disposed at a first end 30 of the bracket.

Specifically, the first polar plate is laminated or press-fitted to the first end 30 of the bracket.

In addition, the first leading wire 2 may be a single conducting wire or a rectangular conducting wire formed by multiple conducting wires.

The first contact portion 3 is configured to be in rigid contact with a to-be-measured object, and is disposed at a second end 31 of the bracket.

The first leading wire 2 is disposed on the first polar plate and an external side of the bracket 1, one end of the first leading wire 2 is connected to the first contact portion 3, and the other end of the first leading wire 2 is connected to the first polar plate.

The second contact portion 6 is disposed at a first end 40 of the support frame, the second polar plate is disposed at a second end 41 of the support frame, the rotating shaft 4 is disposed between the first end 40 of the support frame and the second end 41 of the support frame, and the support frame 5 is hinged to the bracket 1 by using the rotating shaft 4.

Specifically, the second polar plate is laminated or press-fitted to the support frame 5.

It should be noted that both the bracket 1 and the support frame 5 are made of a nonmetallic insulating material, charges are stored inside the first polar plate and the second polar plate, and the charges may be led out by using a conducting wire. For example, the first polar plate and the second polar plate may be metal films, or may be metal plates, but this is not limited.

The second contact portion 6 is configured to be in rigid contact with the to-be-measured object.

The second leading wire 7 is disposed on the support frame 5 and the second polar plate, one end of the second leading wire 7 is connected to the second contact portion 6, the other end of the second leading wire 7 is connected to an internal side of the bracket 1, and both the other end of the second leading wire 7 and the first leading wire 2 are located on a same side of the bracket 1.

In addition, it should be noted that the bracket 1 and the first contact portion 3 are integrally molded, and the support frame 5 and the second contact portion 6 are integrally molded, but this is not limited.

In specific usage, the first contact portion 3 and the second contact portion 6 of the sensor apparatus are in rigid contact with the to-be-measured object. In addition, the first polar plate and the first leading wire 2 form a first electrode of a capacitor, where the first polar plate is disposed at the first end 30 of the bracket, and the first leading wire 2 is disposed on the first polar plate and the external side of the bracket 1 and is used to connect the first polar plate to the outside. The second polar plate and the second leading wire 7 form a second electrode of the capacitor, where second polar plate is disposed at the second end 41 of the support frame, and the second leading wire 7 is disposed on the second polar plate and the support frame 5. In this way, the sensor apparatus can be in rigid contact with the to-be-measured object by using the first contact portion 3 and the second contact portion 6, a stress change of the to-be-measured object drives the rotating shaft 4 to move, and further drives the support, frame 5, with one end connected to the rotating shaft, to move. In this case, the second leading wire 7 disposed on the second polar plate and the support frame 5 also moves with the support frame 5, thereby changing an electrode spacing and an area of overlap between the first electrode and the second electrode of the capacitor, and causing a capacitance value change of the capacitor. Therefore, the stress change of the to-be-measured object can be obtained by means of analysis according to the capacitance value change of the capacitor.

To specify a correspondence between the stress change of the to-be-measured object and the capacitance value change of the capacitor in the sensor apparatus in the present invention, it is assumed that when the sensor apparatus is not connected to the to-be-measured object, the area of overlap between the first electrode and the second electrode is $s_1$, and the spacing between the first electrode and the second electrode is $d_1$.

The first contact portion 3 and the second contact portion 6 of the sensor apparatus are in rigid contact with the to-be-measured object. In this case, the stress change of the to-be-measured object drives the rotating shaft 4 to move, and further drives the support frame 5, with one end connected to the rotating shaft, to move. In this case, the area of overlap between the first electrode and the second electrode is $s_2$, and the spacing between the first electrode and the second electrode is $d_2$. This leads to the capacitance value change of the capacitor. A variation $\Delta c$ of the capacitance value of the capacitor can be calculated according to a formula (1):

$$\Delta c = c_2 - c_1 = \varepsilon\left(\frac{s_2}{d_2} - \frac{s_1}{d_1}\right),$$

where $\varepsilon$ is a dielectric constant between the first electrode and the second electrode, $c_1$ is the capacitance value of the capacitor when the sensor apparatus is not connected to the to-be-measured object, and $c_2$ is the capacitance value of the capacitor when the sensor apparatus detects the stress change of the to-be-measured object.

It may be learned that there is a one-to-one correspondence between the stress change of the to-be-measured object and the capacitance value change of the capacitor in the sensor apparatus. After the variation of the capacitance of the sensor apparatus is input into a computer connected to the sensor apparatus, computer software can accurately obtain, by means of analysis according to the capacitance value change of the capacitor, the stress change of the to-be-measured object.

In this embodiment, the sensor apparatus includes the bracket, the first polar plate, the first contact portion, the first leading wire, the rotating shaft, the support frame, the second polar plate, the second contact portion, and the second leading wire. The bracket is of a cylindrical structure with two open ends. The first polar plate is disposed at the first end of the bracket. The first contact portion is configured to be in rigid contact with the to-be-measured object, and is disposed at the second end of the bracket. The first leading wire is disposed on the first polar plate and the external side of the bracket, one end of the first leading wire is connected to the first contact portion, and the other end of the first leading wire is connected to the first polar plate. The second contact portion is disposed at the first end of the support frame, the second polar plate is disposed at the second end of the support frame, the rotating shaft is disposed between the first end of the support frame and the second end of the support frame, and the support frame is hinged to the bracket by using the rotating shaft. The second contact portion is configured to be in rigid contact with the to-be-measured object. The second leading wire is disposed on the support frame and the second polar plate, one end of the second leading wire is connected to the second contact portion, the other end of the second leading wire is connected to the internal side of the bracket, and both the other end of the second leading wire and the first leading wire are located on the same side of the bracket. In this way, the first polar plate and the first leading wire form the first electrode of the capacitor, the second polar plate and the second leading wire form the second electrode of the capacitor, and the sensor apparatus is in rigid contact with the to-be-measured object by using the first contact portion and the second contact portion. Therefore, the stress change of the to-be-measured object is converted into the capacitance value change of the capacitor formed by the first electrode and the second electrode. In this case, the stress change of the to-be-measured object can be accurately obtained by means of analysis according to the capacitance value change of the capacitor, thereby avoiding a prior-art problem of an inaccurate measurement result caused when a strain gauge sensor apparatus used needs to be attached to a surface of a measured object by using an adhesive.

Further, based on Embodiment 1, in Embodiment 2 of the sensor apparatus provided in the present invention, a conductive film is provided under and covers the first leading wire 2 to improve conductivity of the leading wire.

Figure 2:
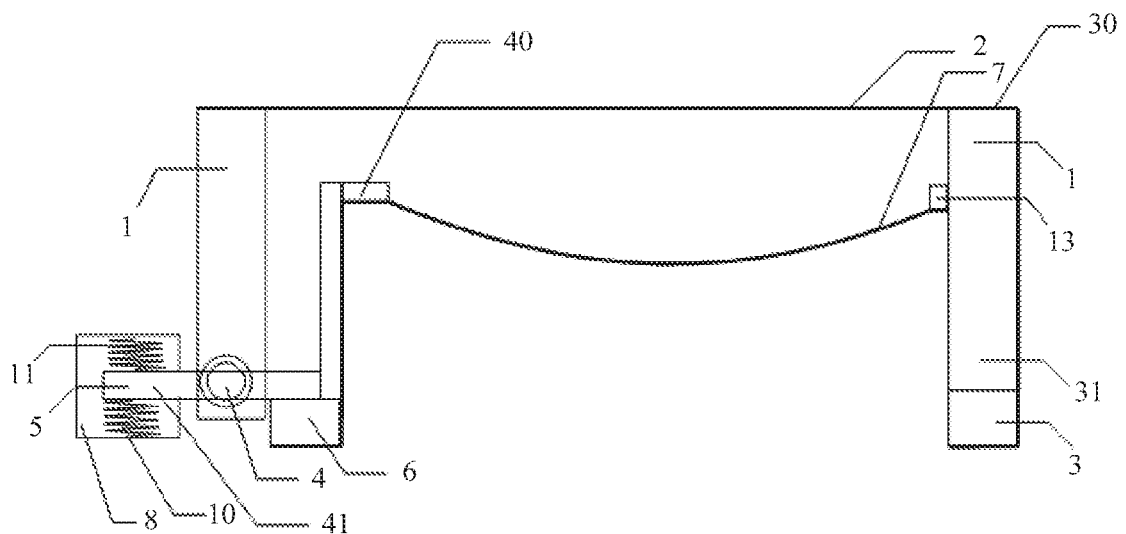
FIG. 2 is a schematic structural diagram of Embodiment 3 of a sensor apparatus according to the present invention.

FIG. 2 is a schematic structural diagram of Embodiment 3 of a sensor apparatus according to the present invention. As shown in FIG. 2, based on the embodiment shown in FIG. 1, the sensor apparatus in this embodiment further includes an elasticity balancing component 8 connected to both the rotating shaft 4 and one end of the support frame 5.

Optionally, the elasticity balancing component 8 includes a third elastic component 10 connected to the rotating shaft 4 and a fourth elastic component 11 connected to one end of the support frame 5. In this way, when the rotating shaft 4 rotates and departs from an initial position, the rotating shaft 4 may return to the initial position under an action of the third elastic component 10 and the fourth elastic component 11 without affecting a next measurement result of the sensor apparatus.

It should be noted that after the third elastic component 10 and the fourth elastic component 11 are disposed, the rotating shaft 4 can return to the initial position under a joint action of the third elastic component 10 and the fourth elastic component 11 regardless of a rotating direction of the rotating shaft 4.

Further, based on any of the foregoing embodiments, in Embodiment 4 of the sensor apparatus provided in the present invention, the bracket 1 is a cylinder, and the cylinder is of a hollow structure.

It should be noted that the bracket 1 may further be a rectangular object, and the rectangular object is of a hollow structure, but this is not limited.

Optionally, a protrusion 13 is provided on an internal side of the bracket 1, and the other end of the second leading wire 7 is connected to the protrusion 13, allowing the other end of the second leading wire 7 to be press-fitted to the internal side of the bracket 1 by using the protrusion 13.

Figure 3:
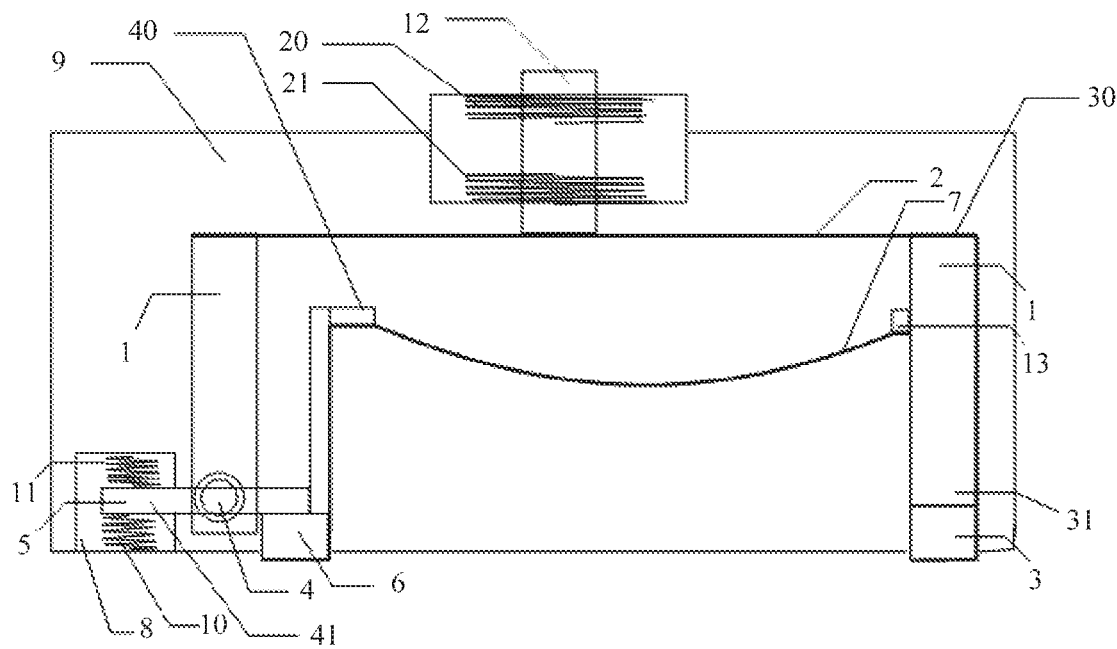
FIG. 3 is a schematic structural diagram of Embodiment 5 of a sensor apparatus according to the present invention.

FIG. 3 is a schematic structural diagram of Embodiment 5 of a sensor apparatus according to the present invention. As shown in FIG. 3, based on the embodiment shown in FIG. 2, the sensor apparatus in this embodiment further includes an outer package body 9.

A bracket 1 is placed in a cavity of the outer package body 9, so that impurity such as dust can be effectively prevented from entering an interior of the bracket 1.

A first contact portion 3 and a second contact portion 6 are placed at the bottom of the outer package body to facilitate contact with a to-be-measured object.

It should be noted that the first contact portion 3 and the second contact portion 6 may be solder pads or contacts.

Optionally, still referring to FIG. 3, the sensor apparatus further includes a sensing portion (not shown in the figure) embedded on the top of the outer package body.

The sensing portion is in contact with the first polar plate to convert stress in a vertical direction applied to the to-be-measured object into a change of an electrode spacing between a first electrode and a second electrode of a capacitor in the sensor apparatus, so that the stress in the vertical direction applied to the to-be-measured object is converted into a capacitance value change of the capacitor in the sensor apparatus. A change of the stress in the vertical direction applied to the to-be-measured object can be obtained by means of analysis according to the capacitance value change of the capacitor in the sensor apparatus.

It should be noted that when the stress in the vertical direction is applied to the to-be-measured object, the sensing portion propels, under an action of the stress, a first leading wire 2 led out from the first polar plate, thereby changing the electrode spacing between the first electrode of the capacitor and the second electrode of the capacitor, and further causing a capacitance value change of the capacitor.

Optionally, the sensing portion includes a sensing rod 12, and a first elastic component 20 and a second elastic component 21 that are configured to restrict movement of the sensing rod 12. This ensures that the sensing rod 12 is constantly in contact with the first leading wire 2 led out from the first polar plate.

It should be noted that the sensing rod 12 may be made of an insulating material.

The sensing rod 12 is in contact with the first polar plate.

Figure 4:
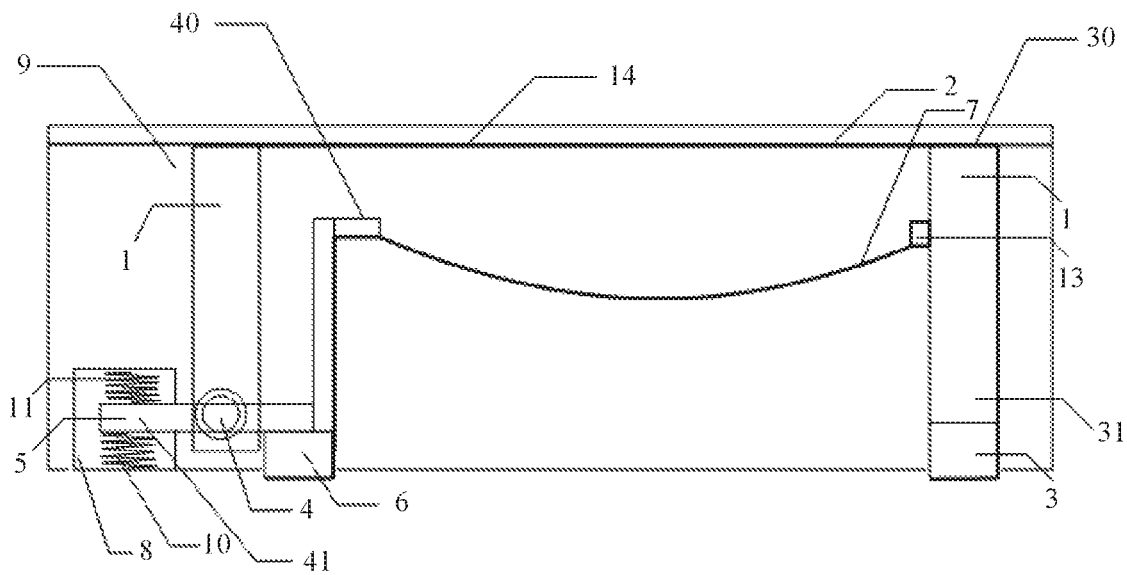
FIG. 4 is a schematic structural diagram of Embodiment 6 of a sensor apparatus according to the present invention.

FIG. 4 is a schematic structural diagram of Embodiment 6 of a sensor apparatus according to the present invention. Based on the embodiment shown in FIG. 3, as shown in FIG. 4, the sensing portion is an elastic film 14.

The elastic film 14 is in contact with a first polar plate.

In specific usage, when stress in a vertical direction is applied to a to-be-measured object, the elastic film 14 deforms, thereby changing an electrode spacing between a first electrode and a second electrode of a capacitor, and causing a capacitance value change of the capacitor.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A sensor apparatus, comprising a bracket, a first polar plate, a first contact portion, a first leading wire, a rotating shaft, a support frame, a second polar plate, a second contact portion, and a second leading wire, wherein
   the bracket is of a cylindrical structure with two open ends;
   the first polar plate is disposed at a first end of the bracket;
   the first contact portion is configured to be in rigid contact with a to-be-measured object, and is disposed at a second end of the bracket;
   the first leading wire is disposed on the first polar plate and an external side of the bracket, one end of the first leading wire is connected to the first contact portion, and the other end of the first leading wire is connected to the first polar plate;
   the second contact portion is disposed at a first end of the support frame, the second polar plate is disposed at a second end of the support frame, the rotating shaft is disposed between the first end of the support frame and the second end of the support frame, and the support frame is hinged to the bracket by the rotating shaft;
   the second contact portion is configured to be in rigid contact with the to-be-measured object; and
   the second leading wire is disposed on the support frame and the second polar plate, one end of the second leading wire is connected to the second contact portion, the other end of the second leading wire is connected to an internal side of the bracket, and both the other end of the second leading wire and the first leading wire are located on a same side of the bracket.

2. The sensor apparatus according to claim 1, further comprising an elasticity balancing component, connected to both the rotating shaft and one end of the support frame.

3. The sensor apparatus according to claim 1, furthering comprising an outer package body, wherein the bracket is placed in a cavity of the outer package body; and the first contact portion and the second contact portion are placed at a bottom of the outer package body.

4. The sensor apparatus according to claim 3, further comprising a sensing portion embedded on a top of the outer package body, wherein the sensing portion is in contact with the first polar plate.

5. The sensor apparatus according to claim 4, wherein the sensing portion comprises a sensing rod, a first elastic component and a second elastic component wherein the first elastic component and the second elastic component are configured to restrict movement of the sensing rod, and the sensing rod is in contact with the first polar plate.

6. The sensor apparatus according to claim 4, wherein the sensing portion is an elastic film.

7. The sensor apparatus according to claim 2, wherein the elasticity balancing component comprises a third elastic component connected to the rotating shaft and a fourth elastic component connected to one end of the support frame.

8. The sensor apparatus according to claim 1, wherein the bracket is a cylinder, and the cylinder is of a hollow structure.

9. The sensor apparatus according to claim 1, wherein a protrusion is provided on the internal side of the bracket, and the other end of the second leading wire is connected to the protrusion.

10. The sensor apparatus according to claim 2, furthering comprising an outer package body, wherein the bracket is placed in a cavity of the outer package body; and the first contact portion and the second contact portion are placed at a bottom of the outer package body.

11. The sensor apparatus according to claim 10, further comprising a sensing portion embedded on a top of the outer package body, wherein the sensing portion is in contact with the first polar plate.

12. The sensor apparatus according to claim 11, wherein the sensing portion comprises a sensing rod, a first elastic component and a second elastic component, wherein the first elastic component and the second elastic component are configured to restrict movement of the sensing rod, and the sensing rod is in contact with the first polar plate.

13. The sensor apparatus according to claim 11, wherein the sensing portion is an elastic film.

\* \* \* \* \*